N. G. VAN HUFFEL.
BUTTER CUTTING MACHINE.
APPLICATION FILED JUNE 29, 1911.
1,055,463.
Patented Mar. 11, 1913.
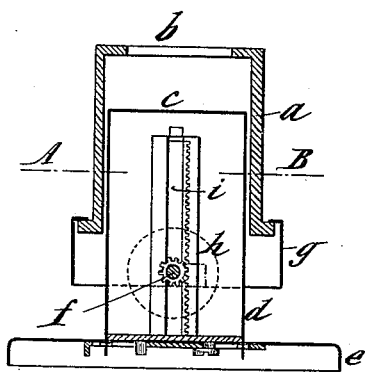
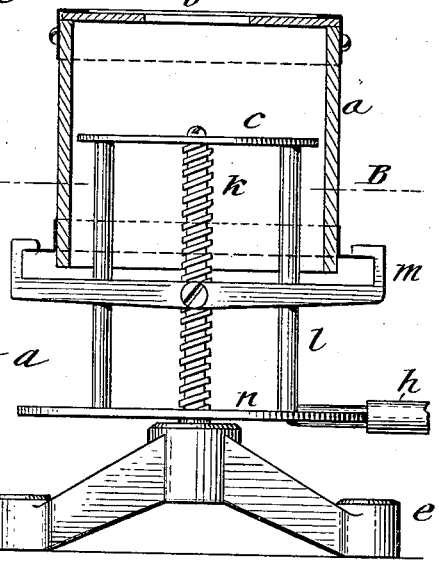
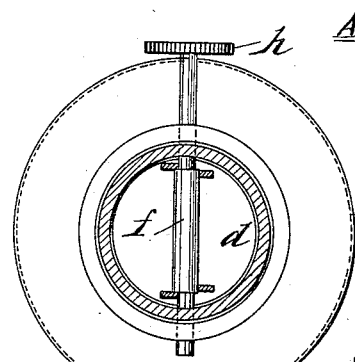
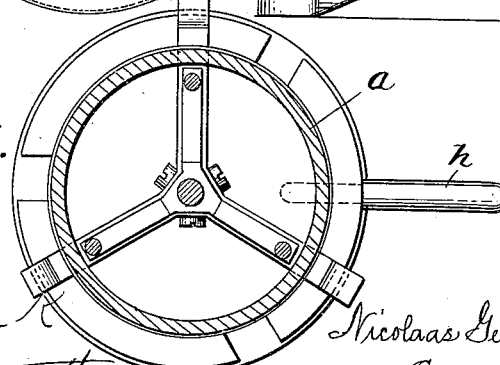
Witnesses:
Inventor
Nicolaas Gerard van Huffel
by his Attorney

UNITED STATES PATENT OFFICE.

NICOLAAS GERARD van HUFFEL, OF UTRECHT, NETHERLANDS, ASSIGNOR TO NAAM-LOOZE VENNOOTSCHAP "LUX", OF UTRECHT, NETHERLANDS, A CORPORATION.

BUTTER-CUTTING MACHINE.

1,055,463.     Specification of Letters Patent.     Patented Mar. 11, 1913.

Application filed June 29, 1911. Serial No. 636,133.

*To all whom it may concern:*

Be it known that I, NICOLAAS GERARD van HUFFEL, a subject of the Queen of the Netherlands, residing at 14 Ridderschap straat, Utrecht, Netherlands, have invented a new and useful Butter-Cutting Machine; and I do hereby declare the following to be a full, clear, and exact description of the same.

The apparatus for preservation and delivery of butter, fat and the like, which forms the subject matter of the present invention has for its object to protect the soft plastic fat against dust, air and the like, and to permit the delivery of the same in measured quantities, as desired, while obviating the detrimental effect that would be produced on said fats by repeated pressure applications.

The apparatus is especially intended for domestic purposes, and is arranged to be easily manipulated by any person sitting at the table. It is hygienic and also economical, because it avoids any loss of butter.

Apparatus have been heretofore constructed for the same purpose, said apparatus including a receptacle in which a piston exerts pressure on the whole mass of butter, fat or the like toward the opposite end of the apparatus, in order to eject the butter through an opening of greater or less size, generally situated either laterally or centrally at the lower part of the structure. All apparatus thus constructed are defective in that the pressure is exerted on the whole mass of butter at each delivery, said pressure being harmful to the butter inclosed in the apparatus.

In the device of the present invention, the butter is ejected through the compressing surface itself, situated at the upper end of the apparatus and in which one or more apertures of any appropriate shape are provided. The butter is thus delivered so that the pressure is exerted on the upper part at the periphery only, and is not communicated to the whole mass contained in the apparatus.

In the accompanying drawing, which shows how the said invention can be conveniently and advantageously carried into practice: Figure 1 shows a vertical section of one form of the improved apparatus. Fig. 2 shows a sectional plan on the line A—A, Fig. 1; Fig. 3 is a detail view of a device connecting the outer receptacle to the driving gear, hereinafter referred to. Fig. 4 shows a modified form of the apparatus in vertical section; Fig. 5 shows a sectional plan on the line A—B, Fig. 4.

As shown in the drawings, $a$ is an outer receptacle, $b$ an opening in the upper part of said receptacle. The opening $b$ is preferably arranged in such a way that the receptacle $a$ has a rim which is broad enough to secure an easy cutting and taking off of the fat expressed through the hole $b$. $c$ is a plate which is fitted inside of receptacle $a$ and on which the fat rests. In the form of construction shown, the plate $c$ forms the upper part of a cylinder $d$ fixed on a base plate $e$. The diameter of the cylinder $d$ and plate $c$ is such as to allow the passage over them of the receptacle $a$, so that the latter can be vertically displaced with reference to $d$ or $c$. The receptacle $a$ is connected to an axle $f$, by means of a flanged ring $g$ (Fig. 3) which is slotted to form a bayonet joint. The axle $f$ is turned by means of a button $h$, and is provided with longitudinal ribs or the like, said ribs acting as gear-teeth and being in mesh with a vertical rack $i$. The shape of cylinder $d$ may be varied, for instance it may be conical.

The operation of this apparatus is as follows: By turning the handle $h$ the movement of the axle $f$ draws down the receptacle $a$ which exerts a pressure on the fat resting on plate $c$; the fat is thus expressed through the opening $b$.

In the modified form of apparatus shown in Figs. 4 and 5, the plate $c$ on which the fat rests is supported by vertical rods $l$, mounted on a rotatable plate $n$. The plate $c$ is supported centrally by a screw-threaded rod $k$ passing through the plate $n$ and fixed to the foot or base $e$. The rod $k$ also supports horizontal arms $m$ between which the vertical rods $l$ pass. The arms $m$ are formed with hook-shaped extremities by which the said arms engage the outer receptacle $a$. The plate $n$ is turned by means of a handle $h$ thus lowering receptacle $a$. The latter, while descending, presses on the fat resting on plate $c$ so that the latter is expressed through the opening $b$.

A protecting cap or the like can be arranged over the opening $b$ in order to protect against dust and air, the small quantity of fat which lies near the opening $b$.

The whole apparatus can be protected by such a removable cap.

Having now described my invention, I declare that what I claim and desire to secure by Letters Patent is:

A butter cutting machine, embodying therein an upright supporting member slotted longitudinally and provided with a rack adjacent said slot, a casing telescoping with said supporting member, said casing being entirely open at one end and having its opposite end provided with a contracted opening adapted to be reciprocated relatively to the supporting end of said supporting member, a stem having a pinion adapted to engage said rack, whereby said casing may be moved longitudinally of said supporting member in either direction, and a flanged ring depending from said casing and having slots therein adapted to form bayonet joints in coöperation with said stem.

In testimony, that I claim the foregoing as my invention, I have signed my name in presence of two subscribing witnesses.

NICOLAAS GERARD van HUFFEL.

Witnesses:
IVAN RAAP,
D. P. DE YOUNG.

Copies of this patent may be obtained for five cents each, by addressing the "Commissioner of Patents, Washington, D. C."